United States Patent [19]
Nicholson

[11] Patent Number: 5,543,954
[45] Date of Patent: Aug. 6, 1996

[54] METHOD AND APPARATUS FOR SELECTIVELY SCANNING FOR OR AIMING A SIGNAL

[76] Inventor: James E. Nicholson, 10908 156th Ct. NE., Redmond, Wash. 98052

[21] Appl. No.: 204,551

[22] Filed: Mar. 1, 1994

[51] Int. Cl.⁶ .................................................. G02B 26/08
[52] U.S. Cl. ........................ 359/201; 359/198; 359/900
[58] Field of Search ................................ 359/198–203, 359/220, 226, 857–860, 871–872, 876, 900; 250/234–236; 248/466; 310/40 R, 75 R, 83, 90, 99, 114; 384/48–50, 91

[56] References Cited

U.S. PATENT DOCUMENTS

| | | | |
|---|---|---|---|
| 3,493,282 | 2/1970 | Rolon . | |
| 4,246,612 | 1/1981 | Berry et al. | 359/201 |
| 4,621,893 | 11/1986 | Lohmann | 359/200 |
| 4,699,447 | 10/1987 | Howard | 359/203 |
| 4,788,423 | 11/1988 | Cline | 250/235 |
| 4,871,904 | 10/1989 | Metlitsky et al. | 359/201 |
| 4,930,884 | 6/1990 | Tichenor et al. | 359/863 |
| 5,173,796 | 12/1992 | Palm et al. | 359/202 |
| 5,216,550 | 6/1993 | Rudeen | 359/795 |

*Primary Examiner*—James Phan
*Attorney, Agent, or Firm*—Paul L. Griffiths

[57] ABSTRACT

A selectable field of view device is disclosed which is capable of expanding the relatively narrow field of view of a camera to nearly spherical proportions. The device includes a pair of signal diverters, such as mirrors in the case of light signals, each mirror's reflective surface being parallel to the other's reflective surface, and each mirror being independently rotatable about an X-axis and a Y-axis respectively. Each axis passes through a central portion of its respective mirror with the Y-axis intersecting the X-axis and the X-axis being relatively centered within the field of view of the sensor. The mirrors may be driven by one or more motors. When one motor is used, a brake and idler arrangement provides for rotation of one mirror while the other mirror remains stationary relative to its respective axis. In addition, when one motor is used, the sensor is rotated by the motor via a drive belt such that the sensor rotates the same amount as does the mirror being rotated.

17 Claims, 5 Drawing Sheets

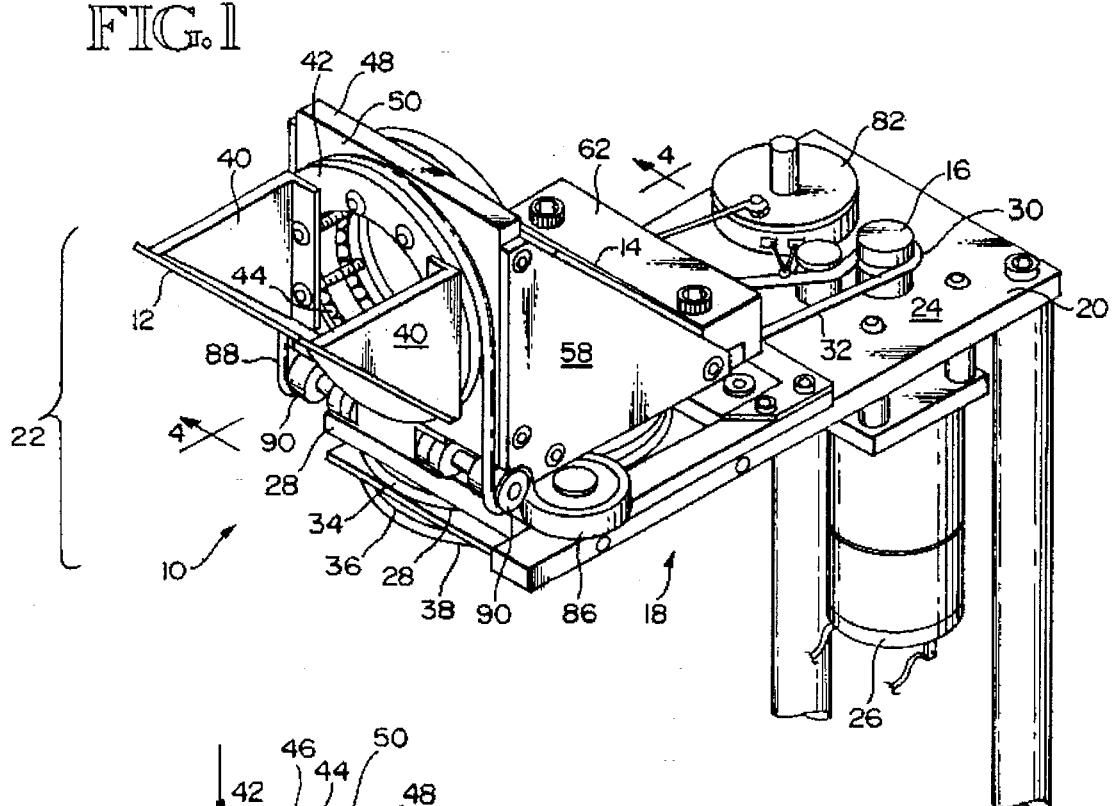
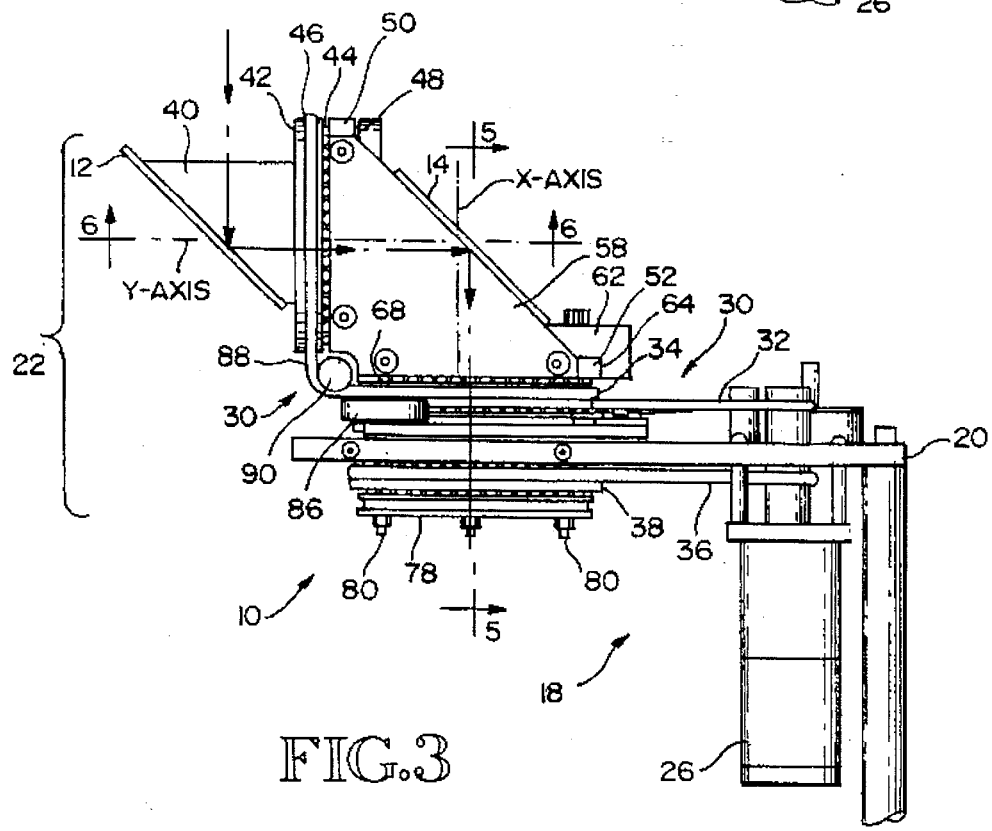

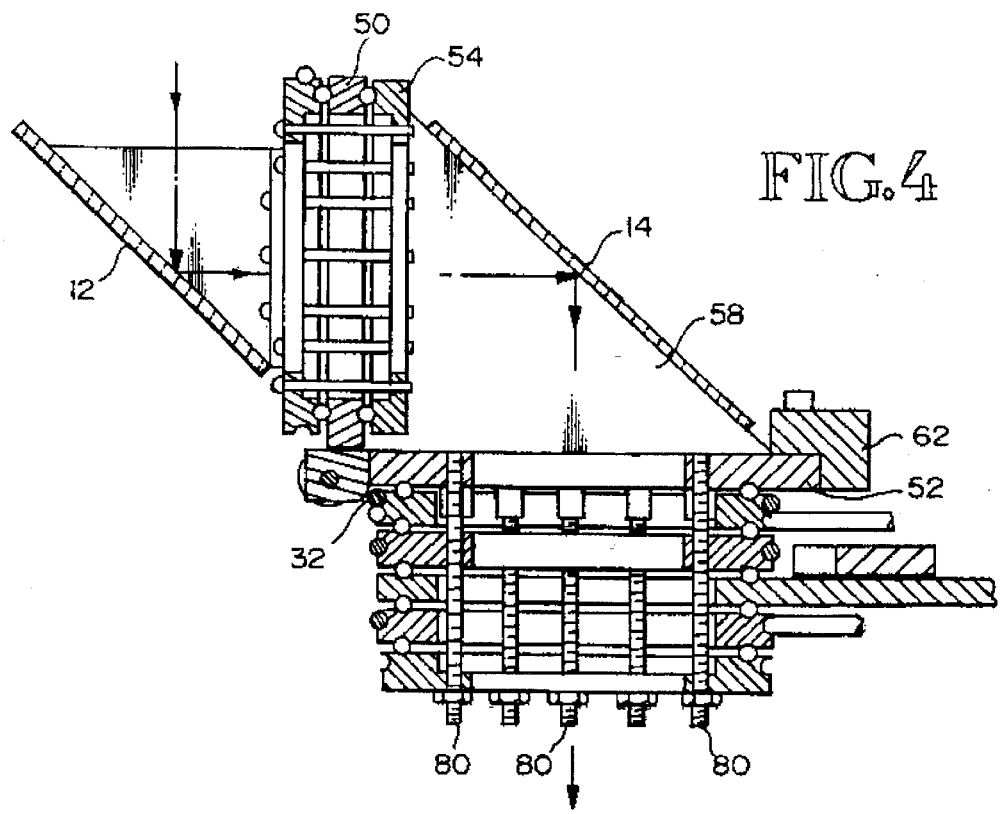
FIG. 4
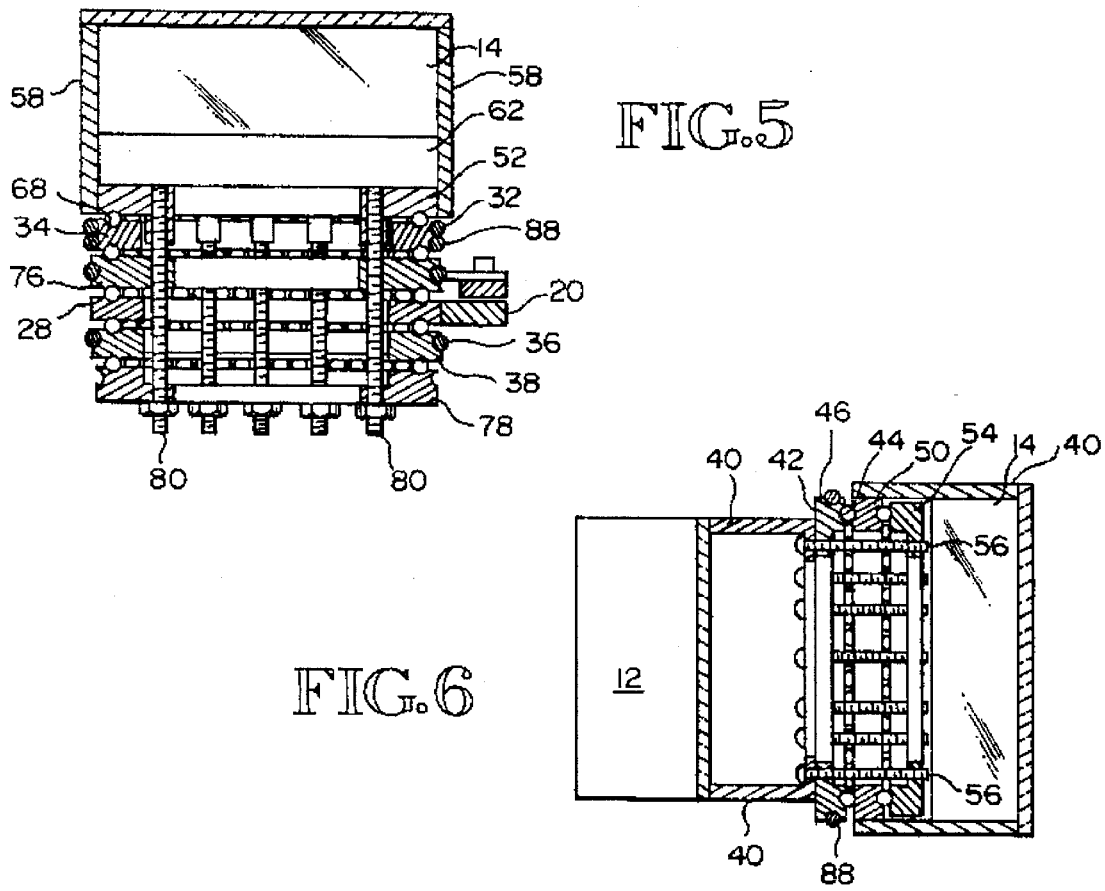
FIG. 5
FIG. 6

METHOD AND APPARATUS FOR SELECTIVELY SCANNING FOR OR AIMING A SIGNAL

TECHNICAL FIELD

The present invention relates to a scanning and aiming devices, and more particularly, to a device for selectively receiving or sending a signal in a spherical manner around said device, while maintaining a stable, non-rotated image having minimal distortion.

BACKGROUND ART

A wide variety of scanning and aiming devices are well known. A common problem among these devices is that they, or their associated signal sensor/generator, have a limited field of view. As an example, a periscope is a commonly known device for redirecting an optical image. Periscopes are used to observe a field of view without exposing oneself, or a piece of equipment, to danger or detection. Periscope type devices are used both on submarines and on land. The devices typically use two flat mirrors positioned in a tubular column such that the signal inlet end can be located remote from the signal outlet end. Since the field of view in these devices is relatively narrow in a horizontal plane, the column must be rotated to increase the field of view within that plane. This is true even when optical lenses are used to increase the field of view. In order to view in a vertical plane, the column must be tilted or one of the mirrors pivoted.

Another example is security cameras, in order to increase the field of view the whole camera is typically rotated in either one or sometimes even two axes. This usually leaves the camera exposed, leaving it vulnerable to damage or avoidance. One solution places the camera in a semi-spherical bubble with a one-way mirror coating. Another problem with moving the entire camera is the location of its center of gravity and hence the inertial factors associated with moving the camera about one or more axes in order to scan an area. This and other problems are addressed by the present invention.

Other more complex devices for redirecting optical images, such as scanners, are commonly used in aircraft or satellites. A common problem is increasing the field of view without distorting an incoming signal. There are two methods of redirecting light signals or images. One is to reflect light, such as by use of a mirror or the like. A second method is to bend a light signal, using refraction, such as by passing light through a lens or prism. The former method is generally simpler and less expensive, primarily due to the quality of the glass required in the latter method.

A major problem area in the scanning arts involves mounting a scanner to an outer surface of an aircraft or satellite. One problem is to maintain the largest possible scan field while at the same time maintaining the quality of the scanned image (signal received). Another problem is in sealing the scanner from the outside environment, or lack thereof in the case of satellites. Prior art devices have addressed some of the problems noted above with limited success.

SUMMARY OF THE INVENTION

The present invention provides a method and apparatus for selectively scanning a spherical range of signal sources. A pair of signal diverters independently rotate about respective axes passing through a central portion of each diverter. The diverters are driven by at least one motor. The axes passing through said diverters intersect at substantially ninety degrees, with the intersection occurring within the plane of one of the diverters.

In the case of optical signals, the signal diverters are flat mirrors, although refractive optical elements could be used dependent upon the signal of interest and the type of sensor used.

In the case of sound or radio wave signals, signal diverters are surfaces designed for maximum signal diversion with minimal distortion. Signal diverters will vary dependent upon the signal of interest and the type of sensor used.

In the case of optical signals, or images, a camera can be used as the signal sensor. In order to maintain the image in a normal relation, i.e., non-rotated, the camera rotates the same number of degrees as does the mirror that is rotating. In the case where both mirrors are rotating at the same time, the camera will rotate at the same angular velocity as the algebraic sum of the two mirrors, e.g., when viewed from the camera, if both mirrors rotate in a clockwise direction, the camera will rotate the same number of degrees as do both mirrors, if one mirror is rotating in an opposite direction, the camera will only rotate an amount equal to the number of degrees rotated by the mirror rotating in a clockwise direction minus the number of degrees rotated by the other mirror (which is rotating counterclockwise).

According to the optical embodiment described above, one mirror has a Y-axis of rotation that passes through a central portion thereof. The Y-axis mirror is supported by a pair of side walls, which are attached to a bearing ring. The bearing ring has an opening therein allowing an image reflected by the Y-axis mirror to pass therethrough. The X-axis mirror rotates about an X-axis passing through a central portion thereof, with the X-axis passing through a central portion of the camera's lens.

When three drive motors are used, the rotation of the mirrors and the camera are electronically controlled. When a single drive motor is used, a mechanical drive system is used that insures that the camera rotates with each mirror. In one embodiment, drive belts are used to connect the drive motor with the mirrors and camera. There are two belts driven directly by the motor's shaft, one drives the camera mounting ring and the other drives a primary drive ring. The primary drive ring is juxtaposed to the X-axis mirror drive ring, being separated by a bearing. Connecting the primary drive ring to the Y-axis mirror drive ring is another belt, which is redirected ninety degrees at two places by a pair of pulleys. Despite the bearing between the primary drive ring and the X-axis mirror drive ring, a rotary solenoid is used in conjunction with a spring to engage a drive belt around just the X-axis drive ring providing a friction brake to ensure that the X-axis mirror does not move when the primary drive ring is driving the Y-axis drive ring. When the rotary solenoid is activated, the brake is released and an idler wheel is pulled into contact with both the primary drive belt and the X-axis drive belt ensuring that only the X-axis mirror is rotated.

Therefor, it is an object of the present invention to provide a selective signal scanner utilizing flat mirrors while providing a nearly spherical field of view, with minimum signal distortion and minimizing the affects of inertial forces.

It is another object of the present invention to be easily mounted to a flat surface, such as a bulkhead or outer surface of an aircraft or the like.

It is another object of the present invention to provide a simple and inexpensive directional aiming device having a nearly spherical target area.

It is yet another object of the present invention to provide a directional scanner such that a scanned image is maintained in a normal position on a monitor, regardless of positional changes of optical elements within the invention.

BRIEF DESCRIPTION OF THE DRAWINGS

In the drawings, like reference numerals and numbers refer to like parts throughout the various views, and wherein:

FIG. 1 is a pictorial view taken from above and to one side of an embodiment of the present invention;

FIG. 3 is a side elevational view of the embodiment shown in FIG. 1 with rotational axes X and Y shown thereon;

FIG. 4 is a slightly enlarged sectional view of a portion of the embodiment shown in FIG. 3;

FIG. 5 is a slightly enlarged cross sectional view taken substantially along lines 5—5 in FIG. 3;

FIG. 6 is a slightly enlarged sectional view taken substantially along lines 6—6 in FIG. 3;

BEST MODE FOR CARRYING OUT THE INVENTION

Figure 2:
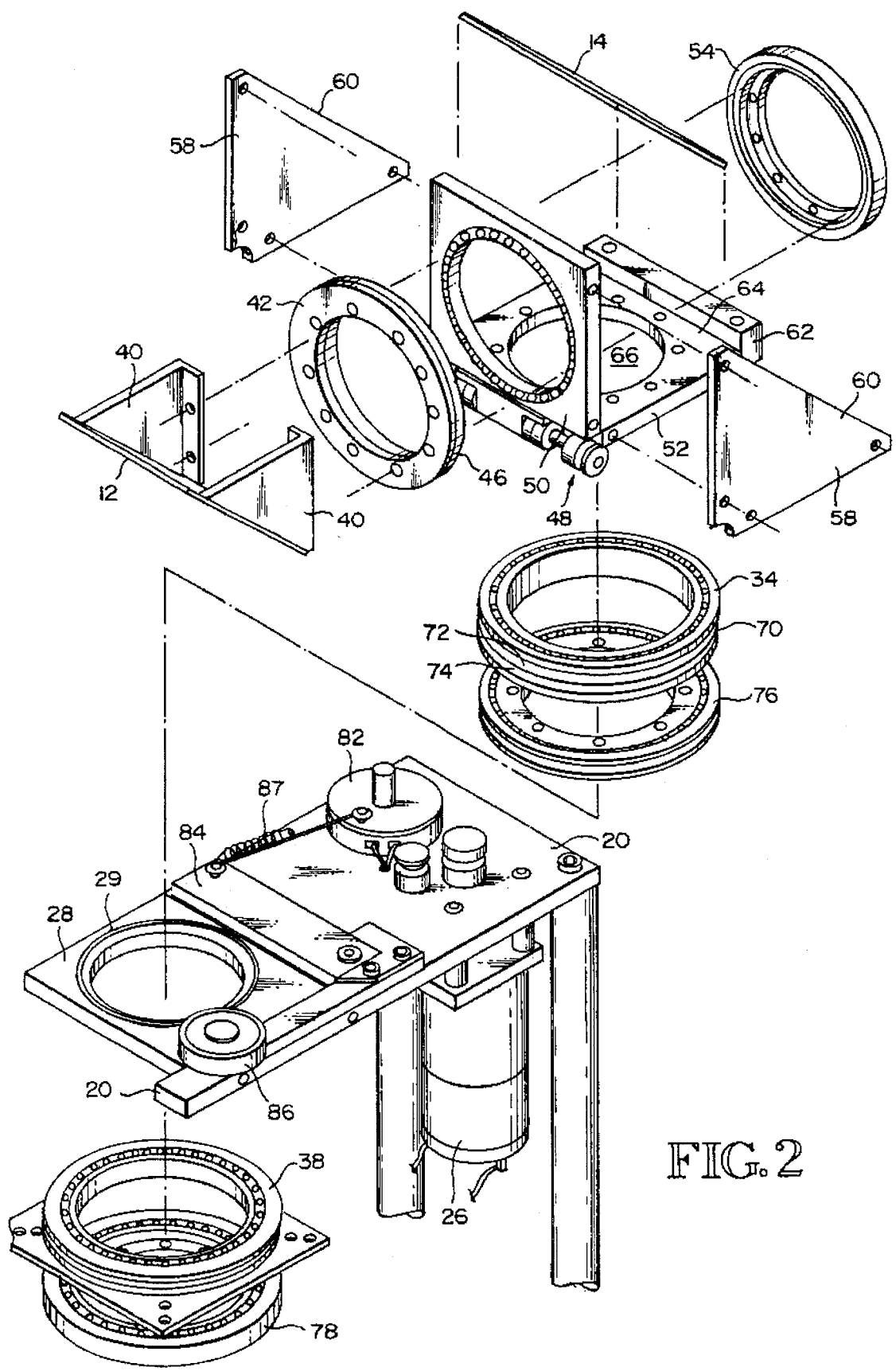
FIG. 2 is an exploded perspective view of FIG. 1 with some elements removed for clarity.

Referring now to FIG. 1, a directional scanner 10 is shown. While scanner 10 can be used to direct a signal, such as a laser beam, the following description is based upon an incoming signal. The incoming signal can be any type of sound, radio, or light wave. The embodiment described herein is for use with light wave energy. Scanner 10 has a first objective mirror 12 and a second objective mirror 14. Mirror 14 is supported for rotation about an X-axis passing therethrough. Mirror 14 is mounted at a forty-five degree angle with respect to said X-axis. Likewise, mirror 12 is supported for rotation about a Y-axis passing therethrough. (See FIG. 3) A mirror rotation means 16 provides the necessary torque to rotate mirrors 12 and 14.

Referring now to FIGS. 1 and 3, support means 18 for mirrors 12, 14 and rotational means 16 will be described. A support member 20, that could be a wall, ceiling, aircraft skin or the like, provides support for rotational means 16 and mirror assembly 22. Support means 18 includes a drive mounting portion 24 for receiving drive means 26. Support means 18 also includes a bearing surface means 28 for receiving mirror assembly 22. Bearing surface means 28 may include a ball bearing race 29 formed therein, or may include a counterbore for receiving a bearing race.

In the embodiment shown in FIGS. 1–4, a drive train means 30, for connecting drive means 16 to mirror assembly 22 includes the use of a primary drive belt 32. Belt 32 connects drive means 16, with a primary drive ring 34 of mirror assembly 22. Drive means 16 can be any suitable rotary motor 26, such as an electric motor, and is preferably a low voltage motor in the range of fourteen to twenty-eight volts. A sensor drive belt 36 connects drive motor 26 with a sensor drive ring 38. A sensor (not shown) such as a video camera, is attached to sensor ring 38 in a manner that allows the sensor to rotate with the ring.

To better understand the relationship of the various drive rings and their related bearings, mirror assembly 22 will now be described in more detail. First mirror 12 is supported by a pair of side supports 40. Mirror 12 is adhesively attached to side supports 40. Side supports 40 are in turn attached to a Y-axis drive ring 42. Side supports 40 hold first mirror at a forty-five degree angle with respect to drive ring 42. Incorporated into one side of ring 42 is a ball-bearing race 44 (see FIG. 3). A drive belt receiving groove 46 is formed in the peripheral edge of ring 42. A right angle support member 48 includes a Y-axis plate 50 and an X-axis plate 52. Each plate, 50, 52, has an opening therein allowing an incoming signal to pass therethrough. Y-axis plate 50, which is perpendicular to the Y-axis, has a bearing race formed on each side thereof. Said bearing races having the same diameter as bearing race 44. A Y-axis retaining ring 54 having a bearing race formed on one side thereof is used to hold ball bearings between ring 54 and Y-axis plate 50 and between ring 42 and Y-axis plate 50, thereby allowing ring 42 to rotate about the Y-axis. Y-axis bearing screws 56 hold ring 42 and retaining ring 54 together (see FIGS. 4 and 6). A standard ball or roller bearing arrangement could be used, with the outer race of such a bearing being seated into Y-axis plate 50.

Second mirror 14 side supports 58 are fastened to Y-axis plate 50 and X-axis plate 52. Side supports 58 have a second mirror mounting edge 60 which form a forty-five degree angle with the X-axis. Second mirror 14 is adhesively attached to mounting edges 60. A counter balance weight 62 may be added to rear edge 64 of X-axis plate 52 in order to balance the weight of first mirror 12 and its associated drive ring 42 and bearings and Y-axis plate 50.

X-axis plate 52 has an opening 66 therein such that signals (light) can pass therethrough. A bearing race 68 is formed in the bottom of plate 52. Primary drive ring 34, hereinafter referred to as combination drive ring, has a first mirror drive belt groove 72 and a primary drive belt groove 74 formed therein. The operation of drive train 30 is described below. Combination drive ring 34 has bearing races formed on both sides thereof. An X-axis drive ring 76 is located below combination ring 70. Drive ring 76 also has bearing races formed on its top and bottom surfaces. Bearing surface means 28 is located below drive ring 76 and has corresponding bearing races 29 formed on its upper and lower surfaces and is held against rotation by support member 20. Sensor drive ring 38 is located below bearing surface 28 and has bearing races formed in its top and bottom surfaces. A bearing retaining ring 78 is located below sensor ring 38 and has a bearing race formed only in its top surface. Threaded rods 80 connect bearing retaining ring 78, X-axis drive ring 76 and X-axis plate 52 such that the three components rotate together when ring 76 is rotated by drive train 30. Ball bearings are placed between each respective pair of bearing races and the bearing pre-load adjusted by tightening or loosening threaded rods 80. Likewise, the bearing races and bearings separating rings 42 and 54 are adjusted by tightening or loosening threaded rods 56.

The operation of the present invention will now be described. Since a sensor, like a video camera or infra-red detector, have a limited field of view, it is desirable to expand that field of view while maintaining good image quality and preferably avoiding image rotation. The sensing device is attached to sensor drive ring 38 in a conventional manner. Hence, whenever drive motor 26 is energized, sensor ring 38 will rotate through the same angle and/or at the same rate as either Y-axis drive ring 42 or X-axis drive ring 76. This motion dictates that a viewed image will remain normal in appearance on a display monitor.

The field of view of the present invention is almost spherical, except for a small conical area above and below second mirror 14, these areas being located along the X-axis. If it is important to see these areas, first mirror 12 can be adjusted to allow the noted areas to be included in the field of view, at the expense of image quality, since distortion of the image will occur. It should also be noted that mirrors 12, 14 could be replaced by other optical devices, such as prisms, dependent upon the application of the invention.

A means for rotating first mirror (signal diverter) 12 about its Y-axis will now be described. Drive train 30 further includes a rotary solenoid 82, a drive ring brake 84 and an idler wheel 86. When primary drive belt 32 moves in response to drive motor 26 being energized, combination drive ring 34 rotates. This is true because X-axis drive ring 76 is held in position by brake 84, which is urged against ring 76 by spring 87. Y-axis drive ring 42 is connected to combination drive ring via a Y-axis drive belt 88 and a pair of idlers 90 that change the direction of drive belt 88. In this manner, first mirror 12 is rotated, providing a scan the width of mirror 12 in an arc of 360° about its Y-axis . In order to scan a different arc, solenoid 82 is energized thereby pulling brake 84 away from drive ring 76 and engaging idler wheel 86 between primary drive belt 32 and drive ring 76. This action rotates second mirror 14, around the X-axis while first mirror 12 remains stationary relative to second mirror 14 i.e., mirror 12 does not rotate about its Y-axis but is simultaneously rotated with mirror 14 about the X-axis due to the structural arrangement described above. Now an arc of 360° around the X-axis is scanned. Hence, almost any point can be scanned by rotating first mirror about its Y-axis or rotating second mirror 14 about its X-axis. Each time either mirror, 12, 14, is rotated, sensor ring 38 is rotated an equal amount, thereby keeping the scanned images in a normal position on a display monitor.

Figure 7:
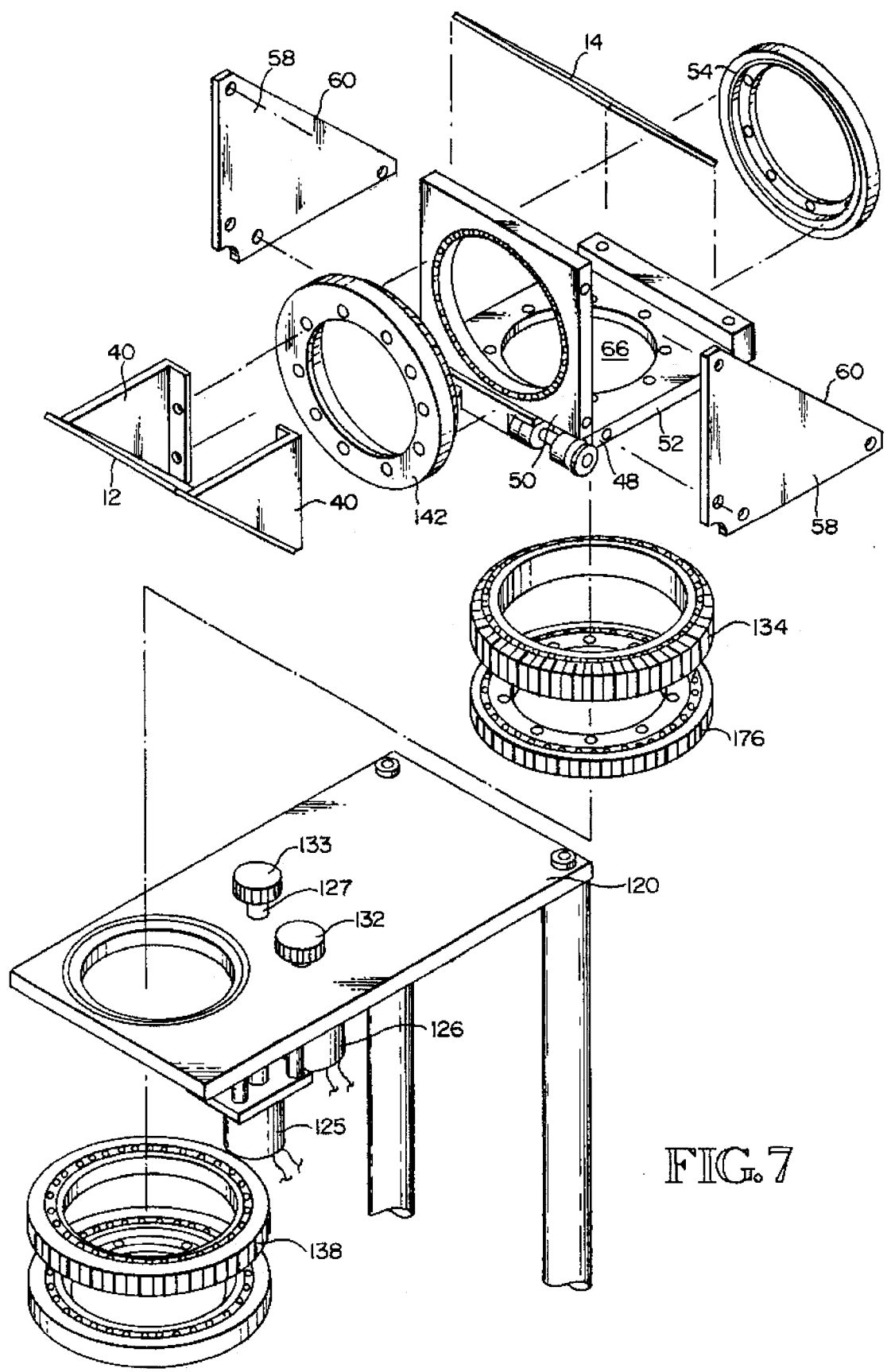
FIG. 7 is an exploded perspective view of a second embodiment of the present invention.

Referring now to FIGS. 7 and 8 (A and B), another embodiment of the invention is shown that utilizes gears instead of belts. Also shown in FIG. 7 is an embodiment of the present invention using a plurality of drive motors, this embodiment is described in detail below.

Figure 8A:
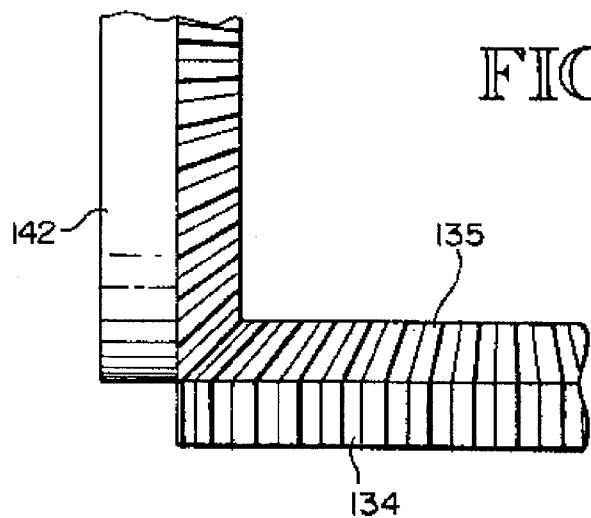
FIG. 8A is an enlarged view showing an alternative drive means for a multi-motor embodiment of the present invention.
Figure 8B:
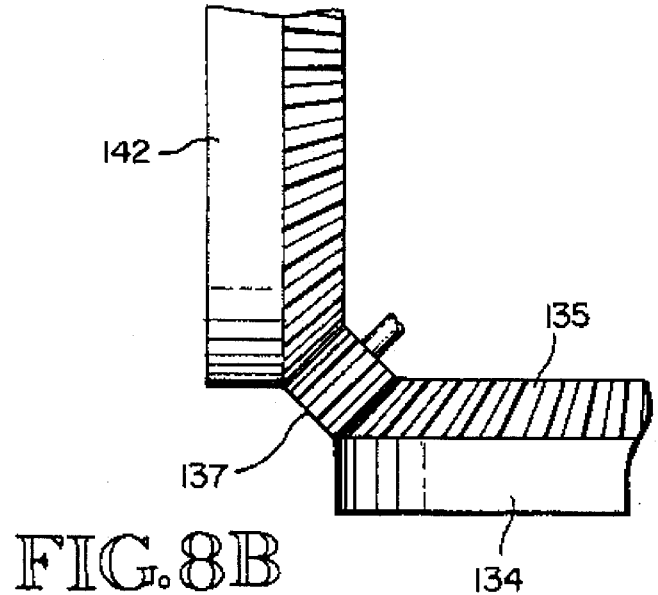
FIG. 8B is a view like FIG. 8A showing an idler gear means for use in a single motor embodiment of the present invention.

In the following descriptions of single motor gear driven and multiple motor gear driven embodiments, similar elements are given one-hundred series numbers that correspond to the embodiment described above. In single motor gear driven embodiment, motor 126 has a drive gear 132 attached to its shaft. Drive gear 132 either directly or through a set of reduction gears (not shown) drives primary drive ring 134, which has gear teeth formed in an edge portion around its periphery. As shown in FIG. 8B, primary drive ring 134 includes a second set of gear teeth 135 that mesh with, and drive, a pinion gear 137 that meshes with, and drives, Y-axis drive ring 142. Drive ring 142 has gear teeth formed on a peripheral edge portion thereof. An X-axis drive ring 176 includes gear teeth formed on a peripheral edge portion thereof. An idler gear (not shown), similar to idler wheel 86 shown in FIG. 2, except this idler has gear teeth thereon that mate with the gear teeth on drive ring 176. Camera drive ring 138 also has gear teeth formed on a peripheral edge portion thereof and is driven either directly or through a gear train by motor 126.

While the invention has been described using a single motor, which is the least expensive method to practice the invention, two or even three motors could be used.

The following description is for an embodiment of the present invention using three drive motors. While a three drive motor embodiment of the present invention could utilize drive belts in a similar manner as does the one motor embodiment, FIG. 7 is referred to and gear drives will be described.

A camera drive motor 125 is mounted to support member 120. Mounted on motor 125 shaft is a pinion gear (not shown). The pinion gear drives camera drive ring 138, which has gear teeth formed on a peripheral edge portion thereof.

An X-axis drive motor 126, mounted on support member 120, includes a pinion gear 132 attached to its shaft. Pinion gear 132 either directly or via a gear train drives X-axis drive ring 176, that includes gear teeth formed on a peripheral edge portion thereof.

A Y-axis drive motor 127, mounted on support member 120, includes a pinion gear 133 attached to its shaft. Pinion gear 133 either directly or via a gear train, drives primary Y-axis drive ring 134. Secondary Y-axis drive ring 142 has gear teeth formed on a peripheral edge portion thereof and is driven either directly or indirectly by drive ring 134. As shown in FIGS. 8A and 8B, primary Y-axis drive ring 134 can mesh directly with drive ring 142 or through a reversing gear 145.

Each motor, 125, 126, and 127 are independently controlled. Y-axis motor 127 can be a reversing motor, so long as that aspect is taken into account by the control system. Drive motor 125 must be able to turn camera drive ring 138 at a rate equal to the sum of motors 126 and 127. Whenever either X-axis or Y-axis drive motors 126, 127 are energized, motor 125 must turn at the same rate in order to prevent image rotation.

Having described the presently-known best mode for carrying out the invention, and various embodiments thereto, it is to be understood that the signal diverter described above and shown in the drawings could be altered in some ways without departing from what is considered to be the spirit and Scope of the invention. For example, it is conceivable, and indeed, it may be likely, that the signal diverter disclosed here will be improved upon in future years. For this reason, any of the foregoing description should not be taken or interpreted in a limiting way, but instead should be used to give life and meaning to the subjoined patent claims which follow. It is the claims which define the metes and bounds of what is considered to be patented, the interpretation of which is to be made in accordance with the established doctrines of patent claim interpretation.

I claim:

1. An apparatus for transmission of signals between a scanning location and selected scanned locations comprising in combination:

a first signal diverter located in a plane fixed at a pre-determined angle to a Y-axis, a second signal diverter located in a plane fixed at a pre-determined angle to an X-axis, said Y-axis being normal to said X-axis and passing through the plane of said second signal diverter, said diverters being constructed and arranged to transmit scanning signals therebetween, and means for rotating said first and second signal diverters about their respective Y and X axes and a means for rotating said first signal diverter about said X-axis.

2. The apparatus of claim 1, wherein said pre-determined angle, for said first and said second diverters, is substantially forty-five degrees to their respective axes.

3. The apparatus of claim 1, wherein said means to rotate said signal diverters about their respective axes includes a means to simultaneously rotate said first signal diverter, and at least part of means for rotating said first signal diverter, about said X-axis when said second diverter is rotated about its X-axis while said first signal diverter remains stationary with respect to its Y-axis.

4. The apparatus of claim 1, wherein said means to rotate said diverters about their respective axes includes;

a motor, a drive train, a diverter assembly, and a support member, whereby said motor and said drive train are mounted on said support member, and said diverter assembly being rotatably mounted to said support member.

5. The apparatus of claim 4, wherein said diverter assembly includes a bearing support frame, said support frame having a Y-axis plate and an X-axis plate each being normal to their respective axis, each plate also having bearing means associated therewith for supporting said diverters in a rotatable fashion.

6. The apparatus of claim 5, wherein said bearing means includes a bearing race formed on both sides of each plate, a Y-axis bearing ring having a bearing race formed on one side thereof, a Y-axis drive ring having a bearing race formed on one side thereof, wherein said bearing races are held apart by ball bearings and said Y-axis drive ring is located on one side of said Y-axis plate and said Y-axis bearing ring is located on the other side of said drive ring with an adjustable fastening means connecting said drive ring and said bearing ring for adjusting pre-load on the bearings;

said bearing means further includes an X-axis drive ring having a bearing race formed on both sides thereof, and said drive train includes a combination drive ring having bearing races formed on both sides thereof, wherein said bearing races are held apart by ball bearings and said X-axis drive ring is located on one side of said combination drive ring and the other side is located on a bearing support surface of said support member, and said combination drive ring having its other side located on said X-axis plate, and located on the opposite side of said support member; and a sensor drive ring having bearing races formed on both sides thereof and an X-axis bearing ring having a race formed in one side thereof, said X-axis plate, said X-axis drive ring and said X-axis bearing ring having an adjustable fastening means connecting them and allowing for adjusting pre-load on the bearings within each of the described bearing races.

7. The apparatus of claim 6, wherein a sensor is mounted to said sensor drive ring, and drive means for rotating said sensor drive ring in such a manner that said sensor rotates an equal number of rotational degrees as the algebraic sum of rotation of said diverters.

8. The apparatus of claim 1, wherein said first diverter and said second diverter are mirrors, whereby a light signal striking said first diverter is directed toward said second diverter, and a sensor whereby said signal is directed into said sensor by said second diverter.

9. The apparatus of claim 8, wherein said sensor includes a means for rotating it an equal number of rotational degrees as the algebraic sum of rotational degrees of said first and said second diverters, regardless of whether said first and said second diverters rotate at the same time, independently and at different rates, and should said diverters rotate in a negative fashion the rotational amount of the diverter rotating the opposite direction is subtracted from the rotational degrees of the other diverter.

10. The apparatus of claim 9, wherein said means for rotating said diverters and said sensor includes a drive train and a single motor whereby said motor drives said drive train.

11. The apparatus of claim 10, wherein said single drive motor has a range of speeds from six to 360 degrees per second, and said drive train means includes a primary drive belt connecting said drive motor to a combination drive ring, a Y-axis drive belt connecting said primary drive ring with a Y-axis drive ring, and a sensor drive belt connecting said motor to a sensor drive ring, and a drive belt around an X-axis drive ring, said X-axis drive ring being associated with an idler wheel and a brake member, including a spring and a rotary solenoid, associated therewith, whereby in a first condition said brake contacts said X-axis drive ring thereby preventing rotation thereof, and a second condition whereby said rotary solenoid is energized thereby releasing said brake and engaging said idler wheel with said primary drive belt and said X-axis drive wheel for rotation of said second mirror about said X-axis while preventing rotation of said first mirror about said Y-axis.

12. The apparatus of claim 10, wherein said drive train includes a plurality of drive belts, a plurality of drive rings associated with said drive belts, a plurality of pulleys associated with said drive belts, an idler wheel for transferring rotational forces between two of said drive belts, and a solenoid actuated brake member acting in concert with a spring to prevent one of said drive belts from turning when said idler wheel is not in contact with two of said drive belts.

13. The apparatus of claim 9, wherein said means for rotating said diverters and said sensor includes a drive train having a plurality of motors controlled by a logic controller, wherein said drive train includes a plurality of gears.

14. The apparatus of claim 1, wherein said means for rotating includes a single drive motor and a drive train means for independent rotation of said first and said second mirrors, and said drive means simultaneously driving a sensor.

15. A drive train for providing rotary motion about a pair of axes normal to each other comprising:

a motor means;

a primary drive belt, said belt being driven by said motor means;

a primary drive ring, said primary drive ring having at least two drive belt receiving grooves formed therein, one of said drive belt receiving grooves receiving said primary drive belt;

an X-axis drive ring, a Y-axis drive ring, each drive ring having a drive belt receiving groove formed therein;

a bracket, said bracket including a Y-axis plate and an X-axis plate with each plate being normal to its respective axis, wherein said primary drive ring is rotatably mounted to said X-axis plate and said Y-axis drive ring is rotatably mounted to said Y-axis plate, and said X-axis drive ring is rotatably mounted to said primary drive ring on the side opposite said X-axis plate and is connected to said X-axis plate;

an X-axis drive belt around said X-axis drive ring;

a pair of Y-axis pulleys mounted to said bracket;

a Y-axis drive belt around said primary drive ring, said Y-axis pulleys and said Y-axis drive ring;

an idler wheel, a brake surface, a spring, and a solenoid associated with said X-axis drive ring, wherein said idler wheel, when actuated by said solenoid, contacts said X-axis drive belt and said primary drive belt for driving said X-axis plate about its axis;

whereby when said idler is not actuated, said spring urges said brake surface against said X-axis drive belt holding it stationary thereby allowing said primary drive belt to rotate said primary drive ring in turn rotating said Y-axis drive belt which in turn rotates said Y-axis drive ring.

16. A method of directing a signal selectively received from a plurality of points surrounding a sensor comprising the steps of:

rotating a first signal diverter about a Y-axis to a pre-selected location, rotating a second signal diverter about an X-axis to a pre-selected position while simultaneously rotating said first signal diverter about the X-axis, diverting a signal received at said first diverter to said second diverter, diverting a signal received at said second diverter to said sensor.

17. The method of claim 16, including rotating said sensor an amount equal to the algebraic sum of rotational degrees of said first and said second signal diverters about their respective axes, thereby maintaining correlation between scanned signals and sensor orientation.

* * * * *